United States Patent [19]

Scott

[11] Patent Number: 4,648,301
[45] Date of Patent: Mar. 10, 1987

[54] ADAPTER FOR CIRCULAR SAW TO CUT-OFF SAW

[75] Inventor: Paul C. Scott, Omaha, Nebr.

[73] Assignee: L Investments, Ltd., Omaha, Nebr.

[21] Appl. No.: 735,615

[22] Filed: May 20, 1985

[51] Int. Cl.⁴ .............................................. B27B 9/04
[52] U.S. Cl. ...................................... 83/464; 83/490; 83/564; 83/574
[58] Field of Search .......................... 83/375, 452–454, 83/490, 464, 466.1, 564, 574; 144/35 A, 35 R

[56] References Cited

U.S. PATENT DOCUMENTS

| 2,630,147 | 3/1953 | Garberg | 83/574 |
| 2,676,624 | 4/1954 | Gecmen | 30/373 |
| 2,842,168 | 7/1958 | Truchan | 83/490 |
| 2,962,062 | 11/1960 | Winkler et al. | 83/490 |
| 3,078,885 | 2/1963 | Burch | 30/376 |
| 3,139,124 | 6/1964 | Hoff | 83/564 |
| 3,232,159 | 2/1966 | Stanley | 83/175 |
| 3,331,406 | 7/1967 | Christophel | 83/574 |
| 3,905,263 | 9/1975 | Smith | 144/35 A |
| 4,283,977 | 8/1981 | Batson | 83/453 |
| 4,328,728 | 5/1982 | Ferdinand et al. | 83/574 |
| 4,537,105 | 8/1985 | Bergher | 83/574 |

Primary Examiner—James M. Meister
Assistant Examiner—Hien H. Phan
Attorney, Agent, or Firm—Glenn K. Robbins

[57] ABSTRACT

An adapter for use with circular saws to provide a ready cut-off or "chop saw" capability. The adapter is comprised of a flat base having adjustable jaws for gripping of bar stock. Hinged to the flat base is a clamping plate for clamping a circular saw to support it in an arc-like movement from a rest position to an operative cut-off position. The clamping plate has a deep groove receiving a base of the circular saw which may be readily clamped therein.

12 Claims, 4 Drawing Figures

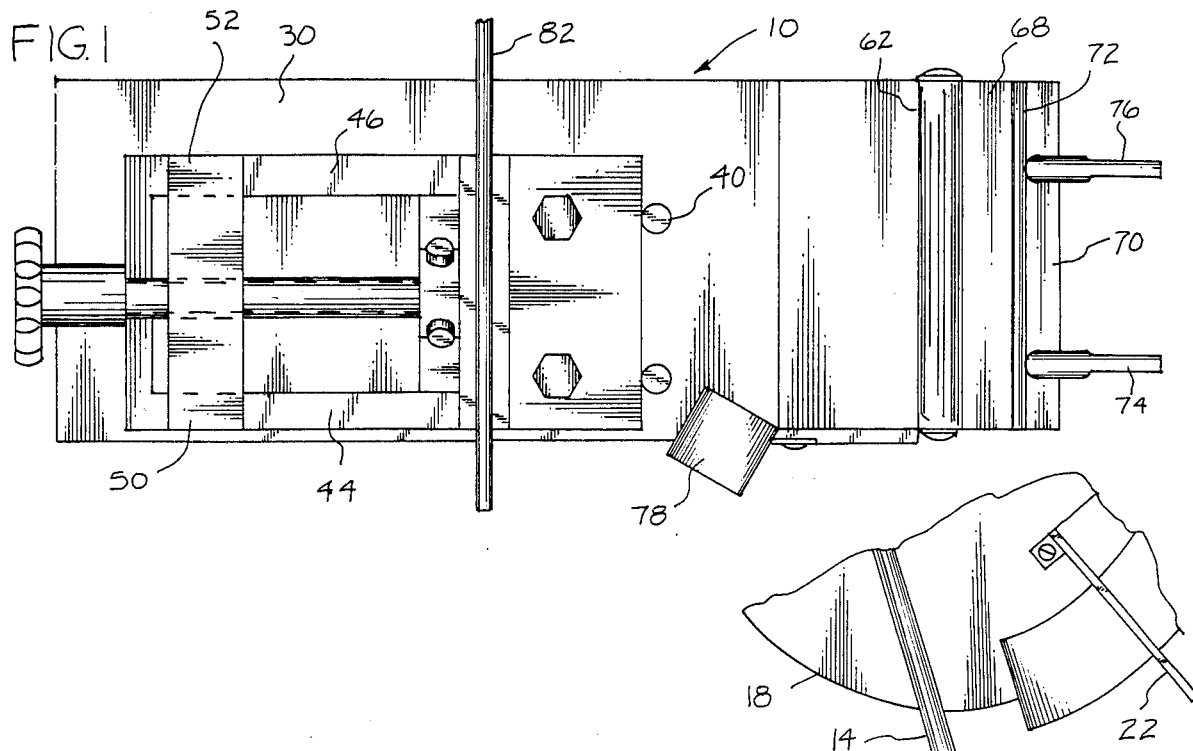
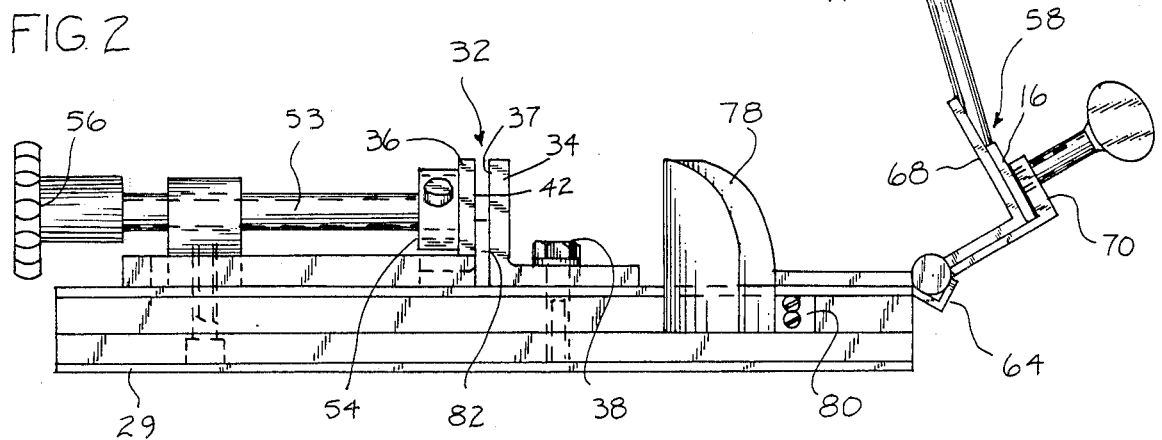

ADAPTER FOR CIRCULAR SAW TO CUT-OFF SAW

BACKGROUND OF THE INVENTION

In the past cut-off or "chop" saws have been employed for conveniently clamping bar stock, rods or the like for cutting off ends of material. Such saws have been of a specialized style and conventionally are of an integrated nature employing an adjustable clamp for the material to be cut and a hinged circular saw equipped with an abrasive blade for cutting metal. The saw is specially designed for use in the integrated cut-off saw and is not adapted for general use.

The afore-mentioned cut-off or "chop" saws, while effective, are of specialized employment for cut-off use and of considerable expense.

While conventional less expensive portable circular saws having the standard flat support base which is slidably positioned on top of the work piece may be employed to cut-off pieces from lengths of bar stock and the like, the use is awkward. A separate clamp or vise for the stock material should be employed and the set-up is awkward and time consuming.

SUMMARY OF THE INVENTION

By means of the instant invention, there has been provided an adapter for converting a conventional portable flat base circular saw to a cut-off or so-called "chop saw".

The adapter is portable and has a flat base which may be supported on a flat work support such as a table or the like. The base is provided with an adjustable vise like clamp for firmly securing lengths of bar stock, rods or the like in a position to be cut-off by a circular saw.

A circular saw clamp is employed to support the saw for pivotable swinging movement from a rest position to a working or cut-off position. The clamp is connected by a hinge to the adapter base to accommodate the swinging movement.

A deep throat or groove in the clamp is used to support and clamp the conventional flat slide base of the circular saw wherein an end of the saw base is received within the groove. Thumb screws are employed to lock the saw base in the throat of the clamp.

The afore-mentioned clamp structure readily receives various types of conventional portable circular saws to provide a versatility in use for the saw and simple adaptation to cut-off or chop saw use. The conversion is simply effected in a minimum of time and expense. The saw may be interchanged with various types of blades as is usual and fitted with a standard abrasive blade for cut-off of metal as desired.

The above features are objects of this invention. Further objects will appear in the detailed description which follows and will be further apparent to those skilled in the art.

For the purpose of illustration of this invention, preferred embodiments thereof are shown in the accompanying drawing. It is to be understood that the drawing is for purpose of description only and that the invention is not limited thereto.

IN THE DRAWING

FIG. 1 is a top plan view of the adapter;

FIG. 2 is a view in side elevation taken from the right side of FIG. 1 showing a fragmentary portion of a circular saw in the rest position;

DESCRIPTION OF THE INVENTION

Figure 3:
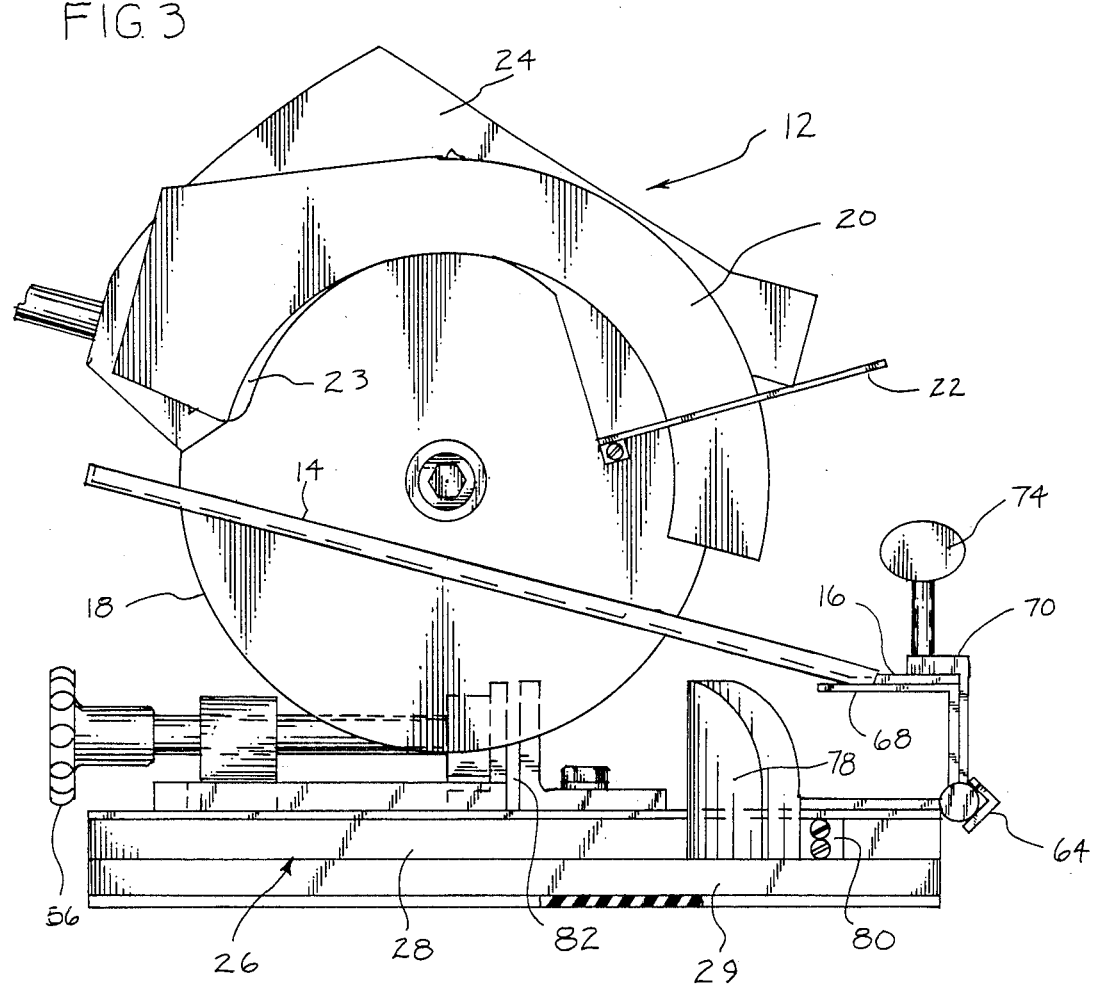
FIG. 3 is a view partly broken away in section similar to FIG. 2 but showing the circular saw clamped to the adapter in the cut-off position.
Figure 4:
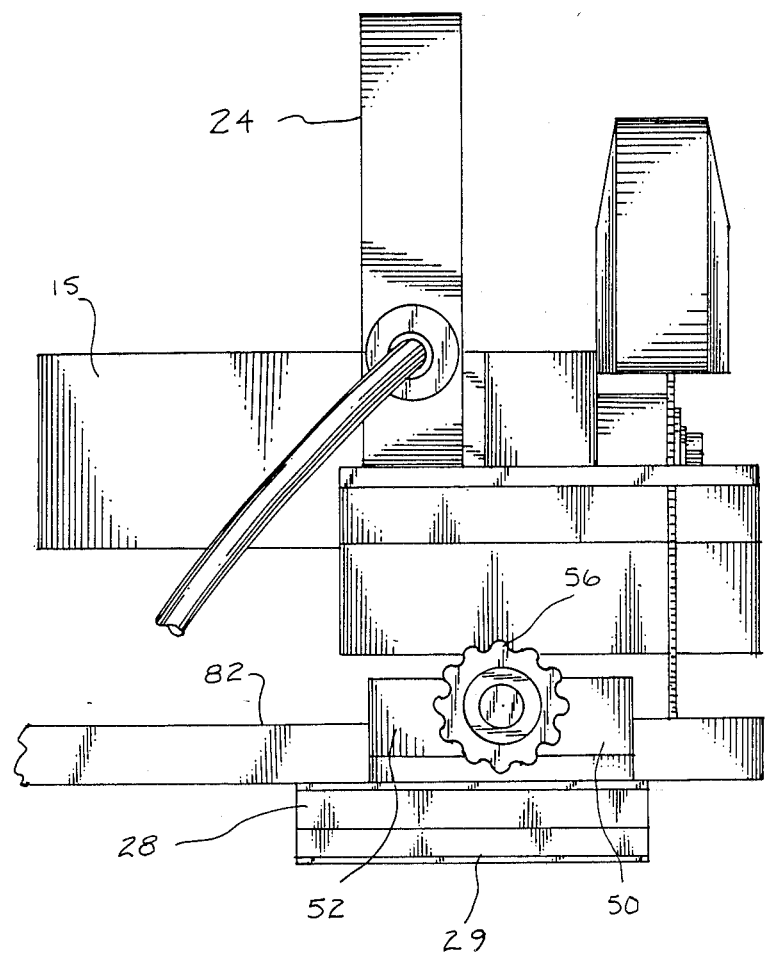
FIG. 4 is a view in side elevation showing a clamped circular saw in the cut-off position of FIG. 3 from the left side.

The adapter of this invention is generally indicated by the reference numeral 10 in FIGS. 1 through 4. A circular saw 12 is shown clamped to the adapter in FIGS. 2, 3 and 4.

The circular saw is of conventional construction employing a standard flat slide plate 14 having a bevelled front edge or toe 16. The saw supports a motor 15 and a circular blade 18 which may be an abrasive blade for metal cutting or interchanged if desired with a toothed blade for wood-cutting. A standard safety shield 20 having a handle 22 for opening the moveable shield 23 is provided along with a saw handle 24. The above features are standard in such portable electric circular saws and form no part of this invention, per se. These features, however, interfit with the structure of the adapter as will be described hereinbelow.

The adapter is comprised of a flat base 26 having side walls 28 of substantial height to position the circular saw blade in the finished cutting action substantially above a work table upon which the base is supported. The base may be made of steel for ruggedness, stability and weight and provided with a bottom pad 29 of rubber or the like for protection of support surfaces and resistance to movement. A top surface 30 of the base supports a work piece vise or clamp 32.

The vise is comprised of a stationary jaw 34 and an adjustable jaw 36 as best shown in FIGS. 1 through 3. The jaw 34 is formed of an upstanding haw fase 37 of an angle iron secured to the adapter base by bolts or the like. These bolts may be reset in threaded openings 40 to provide a greater vise opening as desired.

The adjustable jaw 36 is comprised of an upstanding jaw face 42 supported upon a pair of rails 44 and 46 which interfit with a stationary yoke 48 fixed to the base. The yoke has overhanging end portions 50 and 52 spaced above the top surface of the base and slidably receiving the rails.

In order to adjust the adjustable jaw 36, a threaded shaft 53 is received in a bearing 54 on the jaw. The threaded shaft is fitted through a threaded hole in the yoke and turned by a knob 56 at the free end of the shaft. As the shaft is rotated the adjustable jaw may be opened or closed with respect to the stationary jaw.

In order to support the circular saw, a hinged saw clamp 58 is employed. The saw clamp is comprised of a support member 60 connected to the base 26 by a hinge 62. A stop 64 abutts against the base in a rest position as shown in FIG. 2.

The support member 60 has a generally upstanding clamp portion 66 comprised of plates 68 and 70 spaced from one another to provide a deep throat or groove 72 which receives the bevelled toe 16 of the circular saw sliding support base. Thumb screws 74 and 76 are employed to lock or clamp the circular saw in the clamping groove. For further stability and support of the saw in the clamp, plate 68 extends substantially beyond the plate 70 in order to provide a rest support for the weight of the saw. Where a bevelled front edge or toe 16 is not employed with the flat slide plate (or is of minor extent) it will be understood that it will fit flat in substantially parallel relation within the clamp plates 68 and 70. In any case the clamp is employed at the front of the slide plate and performs equally well for the front end configuration.

The base is further provided with a spark deflector 78 to deflect sparks, sawdust and the like generated in the cutting operation of FIG. 3 downwardly. The deflector is open at the bottom and has a concave interior to direct the deflected material downwardly alongside the side wall of the base to which it is connected by flange 80.

USE

The circular saw adapter of this invention is very simply employed by placing the flat adapter upon a convenient flat work piece such as a table or the like. A conventional circular saw is then clamped to the hinged clamp by insertion of the bevelled flange-like toe 16 into the deep throat 72. The saw is positioned to line the saw blade a short distance from the side of the vise or clamp 32 of the adapter in general alignment with the deflector 78. The thumb screws 74 and 76 are then tightened to clamp the saw firmly in the groove or throat 72.

The saw, when not in the operative position of FIG. 3 may be rested in the rest or support position of FIG. 2 where the stop 64 abuts against the side of the adapter base. The center of gravity of the saw is positioned to the right of the hinge 64 to hold this position.

In use, the saw may be equipped with an abrasive blade for metal cutting or interchanged if desired with a toothed blade for wood-cutting. Such interchange is standard for the usual circular saw.

With the saw ready for use, or as a preliminary operation, a work piece to be cut such as that shown at 82 is clamped in the adapter vise 32. The saw is then grasped by the handle 24 and rotated counter-clockwise as shown in FIGS. 2 and 3 toward the work piece. The handle 22 of the blade shield is operated to open the shield or cover of the movable blade shield 23. The saw is then lowered to engage the saw blade 18 against the work piece 82 to be cut. The center of gravity of the saw is to the left of the hinge 62 as viewed in FIG. 3 and the weight of the saw aids the cutting operation.

When the cut-off operation is completed, the saw is returned to the stable rest position shown in FIG. 2. The work piece is readjusted in the vise and the cutting cycle above described may be completed.

The adapter as will be readily understood from the above description may be simply employed to convert a standard circular saw to a cut-off or chop saw. The adapter is portable and may be used in the field by support on any flat surface support or the like. It is rugged and through its relatively inexpensive cost and simplicity may be employed as a versatile adjunct with the standard circular saw.

Various changes and modifications may be made within this invention as will be apparent to those skilled in the art. Such changes and modifications are within the scope of this invention as defined in the claims appended hereto.

What is claimed is:

1. An adapter for a portable circular saw having a flat horizontal slide base within which a circular saw blade of the circular saw interfits, said adapter having clamp means for supporting said circular saw on said adapter for use as a cut-off saw or chop-saw for cutting off pieces from a work piece supported by said adapter, said adapter being comprised of a flat base supportable upon a work surface such as a table or the like, adjustable vise means for supporting said work piece crosswise above said base, said base having a top surface supporting said vise means and side walls of a substantial height to provide substantial clearance of the work piece above the work piece in a cutting operation, a clamp means support member hingedly connected to said adapter base, said clamp means comprising a clamp element having a U-shaped throat receiving in end seated and load bearing relation a fornt end of the slide base of the circular saw in a generally upstanding rest position and in a genenally horizontally extending cutting position over the work piece in a cutting position and clamp tightening means for clipping the slide base in said throat, the throat of the clamp element extending cross-wise of the adapter base parallel to a hinged connection of the clamp element to the base and being comprised of a pair of plate member spaced from one another defining said throat.

2. The adapter of claim 1 in which said clamp tightening means comprises adjustable thumb screws supported in one of said plate members and adapted to bear against the slide base of the circular saw to force it in clamping relation against a second one of said plate members.

3. The adapter of claim 1 in which said vise means comprises a pair of work piece engaging jaw members, a first one of said jaw members being affixed to said adapter base and a second one of said jaw members having adjustment means for moving it toward and away from said first jaw member, said adjustment means comprising a threaded journal member fixed to said adapter and a rotatable threaded shaft receivable within said journal member, said shaft being connected at one end to said jaw member and at another end to a handle.

4. The adapter of claim 3 in which said shaft has bearing means connecting it to said adjustable jaw member and said jaw member is provided with guide means on said adapter base.

5. The adapter of claim 4 in which a yoke is affixed to the top of said adapter base and said threaded journal is formed in said yoke.

6. The adapter of claim 5 in which said yoke has a pair of arms extending in closely spaced relation transversely above the top of said base and said guide means comprises a pair of rail members fixed to said adjustable member and supported upon the top of the adapter base, said rails being closely received between said yoke arms and the top of said base in slidable relation thereto.

7. The adaptr of claim 1 in which the clamp means comprises a support member extending between the hinged connection to said adapter base, said clamp element being connected to said support member in a generally upstanding relation thereto.

8. The adapter of claim 7 in which said support member is provided with a stop element engageable against said adapter base in the rest position.

9. The adapter of claim 1 in which a first one of said plate members is substantially deeper than the other member and extends underneath the slide base of the circular saw to act as a rest therefore.

10. The adapter of claim 1 in which the adapter base is provided with a rubber like pad on a bottom support surface for work surface protection and resistance to movement thereon.

11. An adapter for a portable circular saw having a flat horizontal slide base within which a circular saw blade of the circular saw interfits, said adapter having clamp means for supporting said circular saw on said adapter for use as a cut-off or chop saw for cutting off pieces from a work piece supported by said adapter, said adapter being comprised of a flat base supportable upon a work surface such as a table or the like, adjustable vise means for supporting said work piece crosswise above said base, a clamp means support member hingedly connected to said adapter base, said clamp means comprising a clamp element having a throat receiving a front end of the slide base of the circular saw and clamp tightening means for clamping the slide base in said throat, said base having a top surface supporting said vise means and side walls of a substantial height to provide substantial clearance of the work piece above the work surface in a cutting operation and deflector means for sawdust, sparks and the like cut from the work piece in cutting opertaion, said deflector means being mounted on a side wall of the base adjacent the vise means.

12. The adapter of claim 11 in which said deflector means comprises a hollowed out concave member mounted to receive said sawdust, sparks or the like to deflect the same downwardly toward the work surface upon which the adapter is mounted.

* * * * *